(12) United States Patent
Lee et al.

(10) Patent No.: US 7,334,188 B2
(45) Date of Patent: Feb. 19, 2008

(54) SYSTEM AND METHOD FOR GENERATING HTML BASED ON COMMON XSLT

(75) Inventors: Patrick R. Lee, Bolingbrook, IL (US); Ching-Yi Kung, Naperville, IL (US); Shyhshiun Chen, Naperville, IL (US); Ayelet Nofar, Kibbutz Ayelet-Hashacar (IL)

(73) Assignee: Computer Associates Think, Inc., Islandia, NY (US)

( * ) Notice: Subject to any disclaimer, the term of this patent is extended or adjusted under 35 U.S.C. 154(b) by 391 days.

(21) Appl. No.: 10/888,920

(22) Filed: Jul. 9, 2004

(65) Prior Publication Data

US 2005/0120043 A1 Jun. 2, 2005

Related U.S. Application Data

(60) Provisional application No. 60/538,371, filed on Jan. 21, 2004, provisional application No. 60/486,378, filed on Jul. 11, 2003.

(51) Int. Cl.
*G06F 17/00* (2006.01)
(52) U.S. Cl. .................................. 715/513; 715/500.1
(58) Field of Classification Search ................ 715/513, 715/500.1
See application file for complete search history.

(56) References Cited

U.S. PATENT DOCUMENTS

| 6,585,778 | B1 | 7/2003 | Hind et al. |
| 6,757,869 | B1 | 6/2004 | Li et al. |
| 7,139,975 | B2 * | 11/2006 | Suzuki et al. ............... 715/513 |
| 2003/0088438 | A1 | 5/2003 | Maughan et al. |
| 2004/0044961 | A1 * | 3/2004 | Pesenson ..................... 715/513 |

OTHER PUBLICATIONS

Froumentin, M., et al, "Using XSLT and SVG Together: A Survey of Case Studies", SVG.OPen/Carto.Net Developers Conference, Jul. 2002, pp. 1-10.*

Christal, Michael G., et al, "Posters and Short Papers: SVG for Navigating Digital News Video", Proceedings of the Ninth ACM INternational Conference on Multimedia, Oct. 2001, pp. 483-485.*

Pietriga, Emmanuel, et al, "Transformations and Experiences: VXT: A Visual Approach to XML Transformations", Proceedings of the 2001 ACM Symposium on Document Engineering, Nov. 2001, pp. 1-10.*

Martin, D.; "Integration by Parts: XSLT, XLink and SVG"; XML. Com, 2000; http://www.xml.com/lpt/a/2000/03/22/style/index.html; retrieved on Sep. 20, 2005.

Alves-Foss, J. et al.; "Experiments in the Use of XML to Enhance Traceability between Object-Oriented Design Specifications and Source Code"; Proceedings of the 35th Hawaii International Conference on Systems Sciences; 2002.

(Continued)

*Primary Examiner*—William Bashore
*Assistant Examiner*—Laurie Ries
(74) *Attorney, Agent, or Firm*—Pillsbury Winthrop Shaw Pittman, LLP

(57) ABSTRACT

A method for generating HTML based on common XSLT includes retrieving XML data from a data provider in response to a request from a client, the XML data comprising at least one dataset associated with at least one SVG tag or at least one table tag. The retrieved data is dynamically transformed using a common XSLT file. One HTML page is automatically generated for each dataset included in the retrieved data at least partially based on the transformation, each HTML page comprising at least one table or one SVG chart.

16 Claims, 4 Drawing Sheets

OTHER PUBLICATIONS

Froumentin, M. et al.; "Using XSLT and SVG Together: A Survey of Case Studies"; SVG.Open/Carto.Net Developers Conference; Jul. 17, 2002; pp. 1-10.

International Search Report issued in International Application No. PCT/US2004/021961; Sep. 29, 2005; 7 pages.

* cited by examiner

SYSTEM AND METHOD FOR GENERATING HTML BASED ON COMMON XSLT

RELATED APPLICATION

This application claims the priorty under 35 U.S.C. § 119 of provisional application Ser. Nos. 60/486,378 filed Jul. 11, 2003 and 60/538,371 filed Jan. 21, 2004.

TECHNICAL FIELD

This disclosure relates generally to the field of data processing, and more particularly to a system and method for generating HTML based on common XSLT.

BACKGROUND

One of the abilities of an enterprise portal is to provide a variety of status monitoring, analysis, reports, and other data from backend data providers to visiting clients. Currently, the data from many data providers is often in the format of industry standard XML, which then must be translated into HTML for clients to view in a browser. In other words, the backend data provider typically transforms the XML data into web-enabled HTML layout for users to view the output (such as report title, report icon, bar/pie/line charts, URL hyperlinks) prior to communicating the data to the portal.

SUMMARY

This disclosure provides a system and method for generating HTML based on common XSLT. In one embodiment, the method includes retrieving XML data from a data provider in response to a request from a client, the XML data comprising at least one dataset associated with at least one Scalable Vector Graphics (SVG) tag or at least one table tag. The retrieved data is dynamically transformed using a common XSLT file. One HTML page is automatically generated for each dataset included in the retrieved data at least partially based on the transformation, with each HTML page comprising at least one table or one SVG chart. The details of one or more embodiments of the disclosure are set forth in the accompanying drawings and the description below. Particular features, objects, and advantages of the disclosure will be apparent from the description and drawings and from the claims.

DETAILED DESCRIPTION OF EXAMPLE EMBODIMENTS

Figure 1:
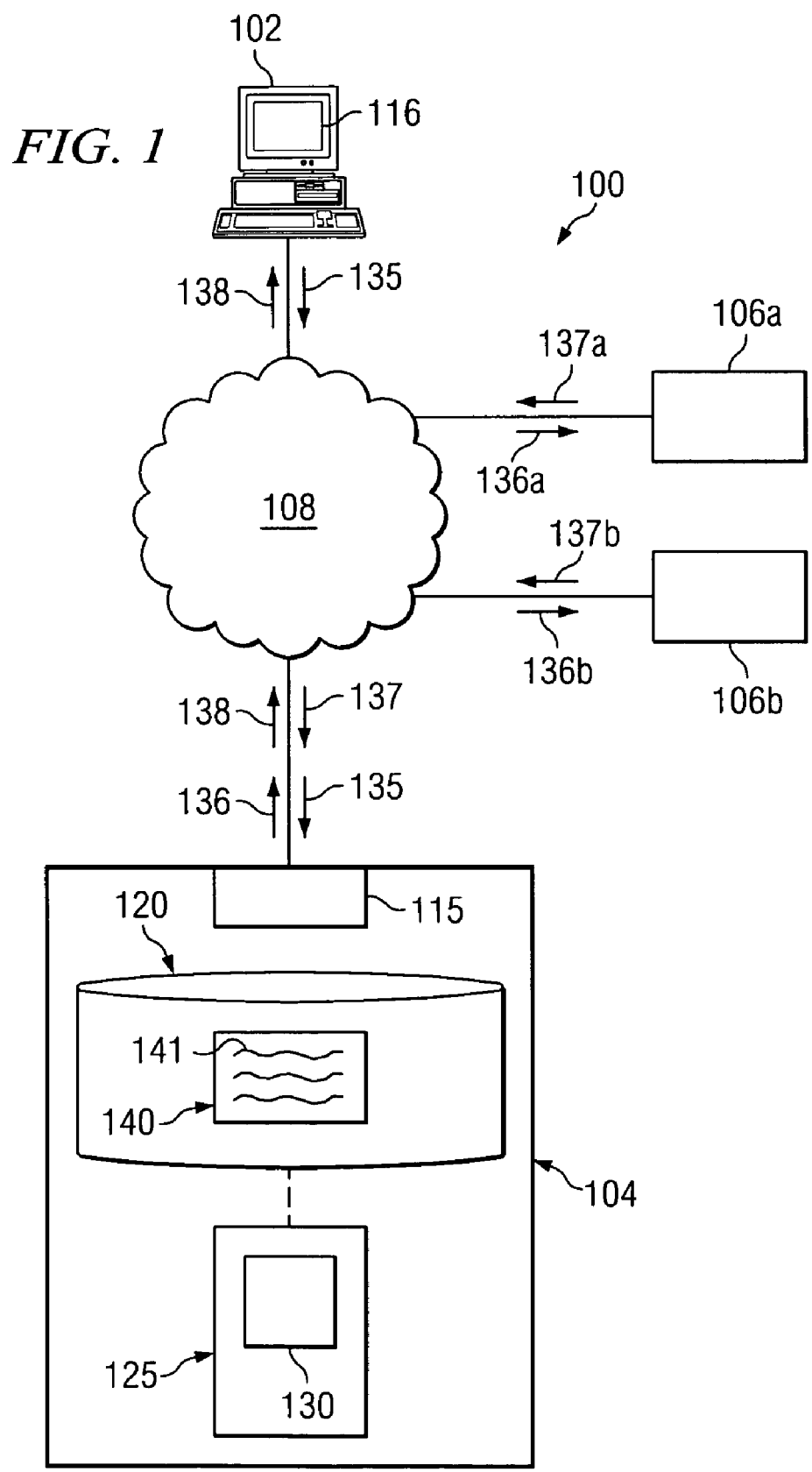
FIG. 1 is a block diagram illustrating a system for presenting a data display generated by using a common XSLT file according to one embodiment of the present disclosure.

FIG. 1 illustrates a system 100 for customizing a data display using a common eXtensible Stylesheet Language: Transformations (XSLT) file 140. At a high level, system 100 is a client/server environment comprising at least one client 102, a server 104, and one or more data providers 106, but may also be a standard computing environment or any other suitable environment. In general, system 100 comprises a system for providing client 102 with data display 216 (illustrated in FIG. 2) customized according to a shared or common XSLT file 140, normally stored on server 104. For example, system 100 may be an enterprise security management system that allows server 104 to present a provider-customized display of security alerts, security components, or any other suitable security data to client 102. System 100 retrieves the appropriate data format from data provider 106 and automatically processes the retrieved data into a format specified in common XSLT file 140. The term "automatically," as used herein, generally means that the appropriate processing is substantially performed by system 100. It should be understood that automatically further contemplates any suitable user interaction with system 100. The term "dynamically," as used herein, generally means that the appropriate processing is determined at least partially at run-time based on one or more variables. In one embodiment, system 100 allows data providers 106 to specify how server 104 presents the requested data through a standard transformation template. Moreover, system 100 allows data providers 106 to communicate smaller output—for example, raw data without display parameters—resulting in reduced need for bandwidth.

Each client 102 may include input devices, output devices, mass storage media, processors, memory, interfaces, communication ports, or other appropriate components for communicating client requests 135 to server 104 and viewing the generated output. It will be understood that there may be any number of clients 102 coupled to server 104. As used in this document, client 102 is intended to encompass a personal computer, workstation, network computer, kiosk, wireless data port, personal data assistant (PDA), one or more processors within these or other devices, or any other suitable processing device. Moreover, "client 102," "user of client 102," and "customer" may be used interchangeably without departing from the scope of this disclosure. For example, client 102 may comprise a computer that includes an input device, such as a keypad, touch screen, mouse, or other device that can accept information, and an output device that conveys information associated with the operation of server 104 or clients 102, including digital data, visual information, or presentation profiles 141. Both the input device and output device may include fixed or removable storage media such as a magnetic computer disk, CD-ROM, or other suitable media to both receive input from and provide output to users of clients 102 through a portion of the customized data display, namely graphical user interface (GUI) 116.

GUI 116 comprises a graphical user interface operable to allow the user of client 102 to interface with system 100 to receive data from data providers 106 in a predetermined format. Generally, GUI 116 provides the user of client 102 with an efficient and user-friendly presentation of data provided by system 100, such as charts and tables. GUI 116 may comprise a plurality of displays having interactive fields, pull-down lists, and buttons operated by the user. In one example, GUI 116 presents multiple charts and tables according to specification by client 102 and receives commands from client 102. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 104 can accept data from client 102 via the web browser (e.g., Microsoft Internet Explorer or Netscape Navigator) and return the appropriate HTML, JAVA, or eXtensible Markup Language (XML) responses.

Server 104 includes memory 120 and processor 125 and comprises an electronic computing device operable to receive, transmit, process and store data associated with system 100. For example, server 104 may comprise a general-purpose personal computer (PC), a Macintosh, a workstation, a Unix-based computer, a server computer, or any other suitable device. According to one embodiment, server 104 may comprise a web server. In short, server 104 may comprise software and/or hardware in any combination suitable to present client 102 with a customized view of data 137 from one or more data providers 106. For example, if server 104 comprises a security server, then security server 104 may provide different security views, reporting of security infrastructure, visualization and reporting of security status, reporting of various security products, remote control of security, integration with internal or third party security, and any other suitable functionality.

FIG. 1 only provides one example of computers that may be used with the disclosure. For example, although FIG. 1 provides one example of server 104 that may be used with the disclosure, server 104 can be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device. Computer server 104 may be adapted to execute any operating system including UNIX, Windows, or any other suitable operating system.

Server 104 includes interface 115 for communicating with other computer systems, such as client 102 and data provider 106, over network 108 in a client-server or other distributed environment. In certain embodiments, server 104 receives common XSLT file 140 from network 108 for storage in memory 120. Network 108 facilitates wireless or wireline communication between computer server 104 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 108. More specifically, interface 115 may comprise software supporting one or more communications protocols associated with communications network 108 or hardware operable to communicate physical signals.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 120 includes at least common XSLT file 140, but may also include any other appropriate data, such as HTML pages or retrieved data 137.

Common XSLT file 140 may be of any suitable format including XML documents, flat files, comma-separated-value (CSV) files, SQL tables, relational database tables, and any other format operable to format XML data from a plurality of data providers 106. In general, common XSLT file 140 provides a shared interface between a plurality of data providers 106 and server 104 that automatically formats requested data according to display parameters specified by the respective data provider 106. In one embodiment, this allows presentation information to be stored server-side, thereby substantially removing the need for data providers 106 to communicate this data and, subsequently, reducing network traffic. In short, common XSLT file 140 comprises any file that describes certain presentation information and display characteristics and is operable to be processed by server 104 for use by data providers 106. Common XSLT file 140 may be created by server 104, a third party software vendor, data provider 106, or any other appropriate user of any computer in system 100 or loaded from a default template. Common XSLT file 140 may be in any electronic format such as, for example, an XML document, comma separated value (CSV) file, EFT record, or any other appropriate data format. In one embodiment, XML is used because it is easily portable, human-readable, and customizable. But common XSLT file 140 may be in any suitable language in any appropriate format based on any protocol or standard, so long as server 104 may format XML data 137 retrieved from a plurality of data providers 106.

Server 104 also includes processor 125. Processor 125 executes instructions and manipulates data to perform the operations of server 104 such as, for example, a central processing unit (CPU), an application specific integrated circuit (ASIC) or a field-programmable gate array (FPGA). Although FIG. 1 illustrates a single processor 125 in server 104, multiple processors 125 may be used according to particular needs and reference to processor 125 is meant to include multiple processors 125 where applicable. In the embodiment illustrated, processor 125 executes presentation engine 130, which processes external data based on common XSLT file 140. Presentation engine 130 could include any hardware, software, firmware, or combination thereof operable to receive a client request 135 from client 102, retrieve data 137 from data provider 106 in a suitable format, and automatically transform the data such that any generic web browser, such as GUI 116, may access it. For example, presentation engine 130 may be written in any appropriate computer language including C, C++, Java, Visual Basic, Perl, and others. It will be understood that while presentation engine 130 is illustrated as a single multi-tasked module, the features and functionality performed by this engine may be performed by multiple modules such as, for example, a retrieving module, a transforming module, and an editing module. Moreover, while not illustrated, presentation engine 130 may comprise a child module of another local or remote software application.

Data provider 106 typically comprises a third party web server or an enterprise agent residing on a target machine. It will be understood that the target machine or process may be remote or on-site; further, the target machine may represent a separate process running on server 104 or client 102 without departing from the scope of this disclosure. Generally, data provider 106 receives requests from server 104 and retrieves data 137 from the software product residing on target machine. Once the data has been gathered, data provider 106 may communicate data 137 to server 104 or server 104 may retrieve data 137 from data provider 106, as appropriate.

Retrieved XML data 137 includes one or more datasets, as well as one or more tags. Each dataset may comprise any appropriate data at least partially responsive to request 135 from client 102. In general, the tags include various data characteristics and presentation parameters that allow server 104 to customize the presentation of data 137 to client 102. The tags may represent or be associated with data, chart attributes, table attributes, link rules, font sizes, colors, background, icons, title text, and any other appropriate component. Generally, the tags include SVG tags and/or table tags. The SVG tags may be any tags for enabling SVG technology in charts, tables, graphs, text boxes, and other suitable graphical elements. Within to the present disclosure, SVG is currently "a language for describing two-dimensional graphics in XML. SVG allows for three types of graphic objects: vector graphic shapes (e.g., paths consisting of straight lines and curves), images and text. Graphical objects can be grouped, styled, transformed and composited into previously rendered objects. The feature set includes nested transformations, clipping paths, alpha masks, filter effects and template objects." (available at www.w3.org). But the table tags may be any tags referencing or defining various table attributes such as, for example, column width and data type. For example, retrieved data 137 may be represented by the following high-level logical format including one or more of the example tags:

```
<!ENTITY % COL_Type "TYPE (boolean|string|char16|
    uint8|sint8|uint16|sint16|
    uint32|sint32|uint64|sint64|
    real32|real64|datetime|month|
    timestamp|enum|bitmask|UTCdate)">
<!-- Reports Root Element -->
<!ELEMENT REPORTS (REPORT)+>
<!-- Report Element -->
<!ELEMENT REPORT (REPORT_INFO?,
((COLS?, RECS) | ERROR))>
<!-- Report Information -->
<!ELEMENT REPORT_INFO (TITLE?, DATE?, TIME?,
    CHART?, TEXT*,
ICON?)>
    <!ELEMENT TITLE (#PCDATA)>
    <!ELEMENT DATE (#PCDATA)>
    <!ELEMENT TIME (#PCDATA)>
    <!ELEMENT CHART EMPTY>
    <!ATTLIST CHART YAxisText CDATA
        defaultType (BAR|PIE|LINE) #IMPLIED
        Align (Left|Right|TopDown) #IMPLIED>
    <!ELEMENT TEXT (#PCDATA)>
    <!ATTLIST TEXT NAME CDATA #IMPLIED>
    <!ELEMENT ICON (#PCDATA)>
    <!-- Column Headers -->
    <!ELEMENT COLS (COL)+>
    <!ATTLIST COLS Width CDATA #IMPLIED>
    <!ELEMENT COL EMPTY>
    <!ATTLIST COL NAME CDATA
        %COL_Type;
        YAxisData (y|n) #IMPLIED>
```

It will be understood that the preceding example XML data format is for illustration purposes only. Example retrieved XML data 137 may be in any logical format operable to be processed by server 104 using common XSLT file 140 and include none, some, or all of the illustrated tags as well additional tags not illustrated.

In one aspect of operation, client 102 communicates a client request 135 to server 104. Before client request 135 is received by server 104, system 100 may require that client 102 log on to server 104 as appropriate. For example, if system 100 comprises an enterprise security management system, then server 104 may verify client 102 before accepting client request 135. If not previously loaded, server 104 loads common XSLT file 140 for processing one or more requests 135 through one or more data providers 106.

Server 104 then processes client request 135 to retrieve the requested XML data 137 from data providers 106. For example, if server 104 comprises webserver components, then server 104 may use the Apache Jakarta Tomcat servlet engine to process portions of client request 135. Based upon client request 135, presentation engine 130 communicates server request 136 to data provider 106 in order to retrieve the desired web-enabled data. According to one embodiment, there may be more than one data provider 106 necessary to fulfill client request 135. Accordingly, as illustrated in FIG. 1, a first data provider 106a may receive a first server request 136a and a second data provider 106b may receive a second, and occasionally different, server request 136b. After suitable processing, the requisite one or more data providers 106 communicate output 137, which comprises web-enabled, or XML, data. Once the XML data 137 is received (or retrieved) by server 104, presentation engine 130 initiates the XSLT transformation procedure using the loaded common XSLT file 140. At least partially based on various tags defined in XML data 137 and the transformation, presentation engine 130 customizes the resulting data display 116 for client 102. According to particular embodiments, this customization procedure is, at least in part, implemented using the extensibility mechanism in XSLT. Server 104 then communicates customized data display 116 to client 102 using any appropriate protocol such as, for example, the HTTP/HTTPS protocol.

Figure 2A:
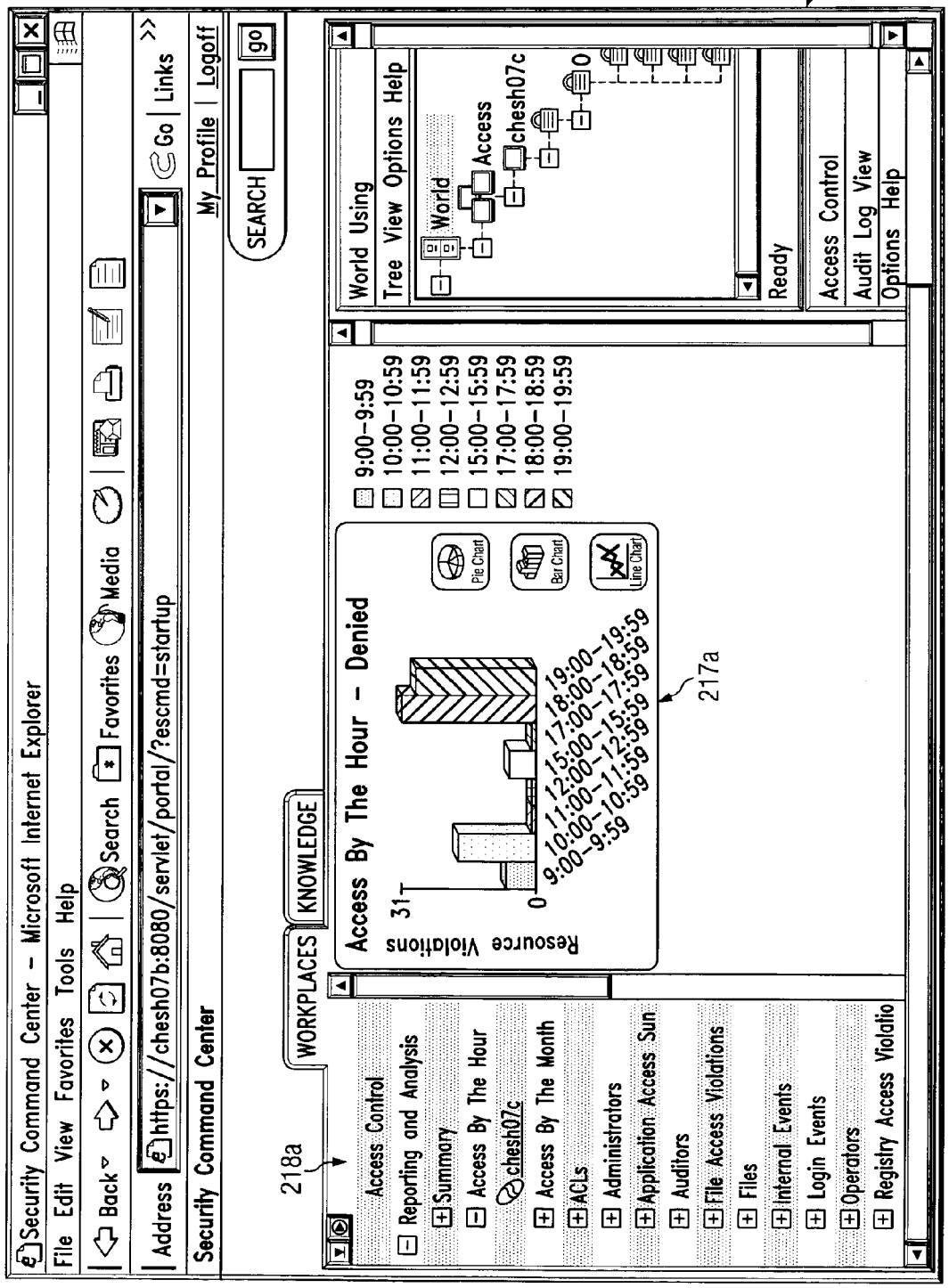
FIGS. 2A-B illustrate various examples of a data display with SVG elements presented by the system in FIG. 1.
Figure 2B:
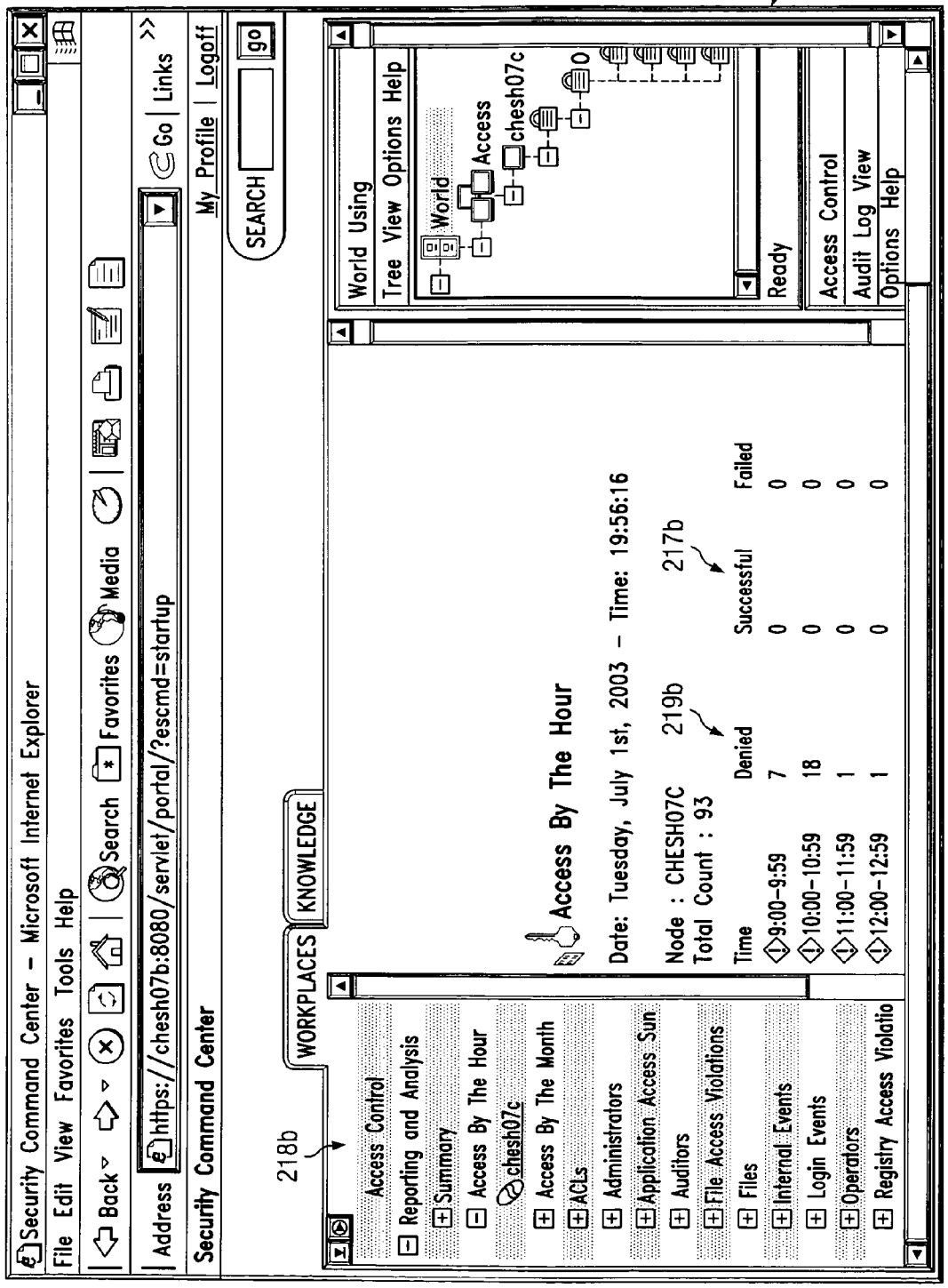

FIGS. 2A-B illustrate various examples of customized data display 216. Often, data display 216 is presented to client 102 using GUI 116; said another way, data display 216 is one embodiment of GUI 116. In general, data display 216 presents XML data 137 from data providers 106 in a format defined by data providers 106, without requiring data providers 106 to convert XML data 137 to HTML pages prior to communication to server 104.

FIGS. 2A-B illustrate example customized data display 216. For example, FIG. 2A illustrates data display 216a that includes SVG chart 217a and tree 218a. In this example, presentation engine 130 retrieves data from data provider 106 and automatically formats the retrieved data, with one or more appropriate SVG tags, into SVG chart 217a based on common XSLT file 140. Further, SVG chart 217a includes figure-type selections that allow the user of client 102 to select the figure type such as chart, table, and line chart. Tree 218a allows the user to select different nodes in a logical tree. For example, if client 102 selects a different node from the one illustrated, presentation engine 130 may automatically retrieve different data from the same or a different data provider 106 and present different information, in the same or different format, in data display 216a.

FIG. 2B illustrates data display 216b, which is substantially similar to data display 216a. In this embodiment, the retrieved data 137 is similar (or identical) and presentation engine 130 automatically formats the retrieved data into table 217b alternatively to or in combination with chart 217a, illustrated in FIG. 2A. For example, FIG. 2B includes example column 219b of Table 217b. Chart 217a represents the data from this column. This disclosure contemplates that chart 217a presents this data based on common XSLT file 140, customization by data provider 106, selection by a user, or any other suitable criteria. It will be further understood that exemplary customized data display 116 (described above as example data displays 216a and 216b, respectively) is for illustration purposes only and may include none, some, or all of the illustrated presentation elements as well as additional presentation elements not shown.

Figure 3:
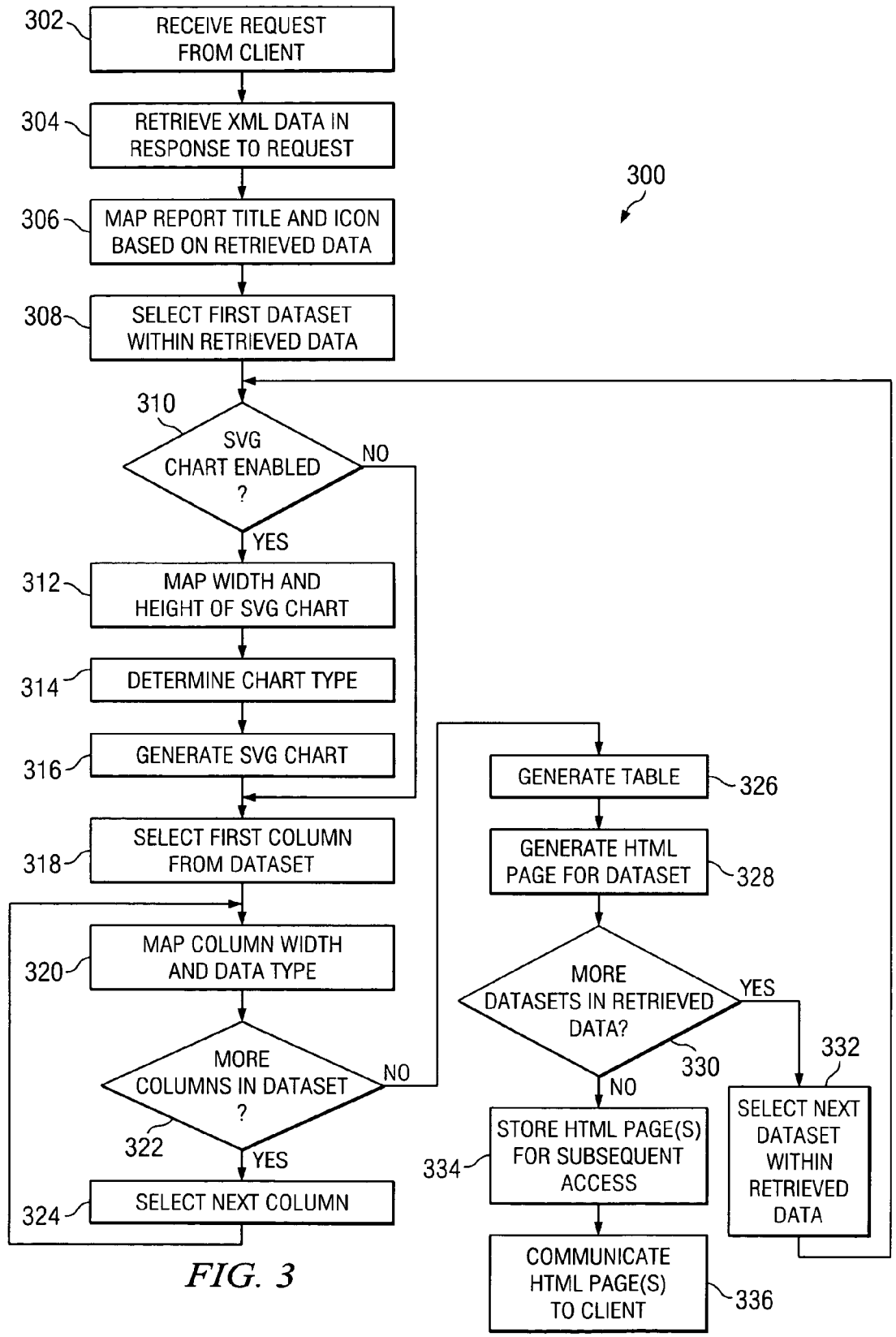
FIG. 3 is a flowchart illustrating an example method for presenting a data display generated by using a common XSLT file.

FIG. 3 illustrates a flow chart of an exemplary method 300 for presenting a customized data display 216 to client 102 using a common XSLT file 140. Method 300 is described in respect to system 100. However, any other suitable system may use method 300 to create and provide customized data display 216 without departing from the scope of this disclosure. Generally, method 300 describes server 104 loading a common XSLT file 140 and creating customized data display 216, using data from one or more data providers 106, at least partially based on the loaded common XSLT file 140.

Server 104 receives client request 135 from client 102 at step 302. Once client request 135 has been received by server 104, presentation engine 130 retrieves XML data 137 from a data provider 106 in response to request 135 at step 304. As described above, client 102 may comprise a user of server 104 and data provider 106 may comprise an internal or external computer or a process running on server 104 without departing from the scope of this disclosure. Once XML data 137 has been retrieved, presentation engine 130 may parse XML data 137 into one or more component parts for processing. At step 306, presentation engine 130 maps the report title and report icon based upon XML data 137. For example, XML data 137 may include one or more high level tags corresponding to the report title and report icon for use in the generation of the HTML pages viewable in GUI 116. Next, in steps 308 through 332, presentation engine 130 processes individual datasets within XML data 137.

At step 308, presentation engine 130 selects the first dataset within retrieved XML data 137. Presentation engine 130 then determines if the first dataset is SVG chart enabled based on or more SVG tags located in the first dataset at decisional step 310. If the dataset is SVG chart enabled, then presentation engine 130 maps the width and height of SVG chart 217a based on additional SVG tags in data 137 at step 312. Next, at step 314, presentation engine 130 determines the chart type, such as pie chart, bar chart, and line chart, based on one or more additional SVG tags. In the absence of one or more additional SVG tags, presentation engine 130 may use default values based on any appropriate algorithm, initialization file, variables, or other default processing. Once the appropriate SVG tags have been processed, presentation engine 130 generates SVG chart 217a for subsequent embedding in an HTML page at step 316. Once SVG chart 217a has been generated (or if the SVG chart was not enabled at decisional step 310), presentation engine 130 generates table 217b in steps 318 through 326.

Presentation engine 130 selects a first column for table 217b from the XML data at step 318. Next, at step 320, presentation engine 130 maps the column width and data type for the selected column based on additional table tags. For example, the data type may comprise Boolean, string, char 16, uint8, sint8, uint16, sint16, uint32, sint32, uint64, sint64, real32, real 64, date time, month, time stamp, enum, bit mask, or UTCdate. As with SVG chart 217a, presentation engine 130 may use default values in the absence of one or more table tags. At decisional step 322, presentation engine 130 determines if there are more columns in the dataset. If there are, then presentation engine 130 selects the next column in the data step 324 and processing returns to step 320. Once all of the columns in the dataset have been processed, presentation engine 130 generates table 217b at step 326.

At step 328, presentation engine 130 generates one or more HTML pages based at least partially on the XML data formatted and transformed using common XSLT file 140. According to certain embodiments, this transformation may be accomplished through standard XSLT techniques. Presentation engine 130 then determines that there are more datasets in retrieved XML data 137 at decisional step 330. If there are more datasets, then presentation engine 130 selects the next dataset at step 332 and processing returns to step 310. Once the appropriate HTML pages have been generated, presentation engine 130 can, alternatively or in combination, store the generated HTML pages for subsequent access at step 334 or communicate the generated HTML pages to requesting client 102 at step 336. It will be understood that presentation engine 130 may further customize generated HTML pages or generate additional HTML pages without departing from the scope of this disclosure.

The preceding flowchart and accompanying description illustrate only an exemplary method 300 for server 104 to create customized data display 216 using the common XSLT file 140. However, system 100 contemplates server 104 using any suitable technique for performing these tasks. Thus, many of the steps in this flowchart may take place simultaneously and/or in different orders than as shown. Moreover, server 104 may use alternative or additional methods with additional steps, fewer steps, and/or different steps, so long as the methods remain appropriate.

Although the present disclosure has been described in detail, it should be understood that various changes, substitutions and alterations can be made hereto without departing from the sphere and scope of the disclosure as defined by the appended claims.

What is claimed is:

1. A computer-implemented method for generating HTML based on common XSLT comprising:
receiving at a server a request from a client;
in response to the request from the client, sending from the server a first server request to a first data provider and a second data request to a second data provider;
receiving at the server, first XML data from the first data provider in response to the first server request and second XML data from the second data provider in response to the second server request, the first XML data including at least one dataset associated with at least one SVG tag or at least one table tag, and the second XML data including at least one dataset associated with at least one SVG tag or at least one table tag;
dynamically transforming, at the server, the first XML data using a common XSLT file;
dynamically transforming, at the server, the second XML data using the common XSLT file;
determining whether the first XML data includes a plurality of datasets;
determining whether the second XML data includes a plurality of datasets;
automatically generating, at the server, one HTML page for each dataset included in the first XML data based, at least partially, on the first transformed XML data, each HTML page including at least one table or one SVG chart; and
automatically generating, at the server, one HTML page for each dataset included in the second XML data based, at least partially, on the second transformed XML data, each HTML page including at least one table or one SVG chart.

2. The method of claim 1, wherein the first XML data includes at least one dataset associated with at least one SVG tag, the at least one SVG tag includes:
- an SVG-disabled parameter;
- an SVG-enabled parameter;
- a dimension of an SVG chart; or
- a chart type.

3. The method of claim 2, wherein the at least one SVG tag is a chart type comprising:
- a bar chart;
- a pie chart; or
- a line chart.

4. The method of claim 1, wherein the first XML data includes at least one dataset associated with at least one table tag, the at least one table tag includes:
- a table alignment;
- a column width; or
- a column data type.

5. The method of claim 1, at least one of the generated HTML pages including JavaScript operable to support dynamic graphics functionality.

6. A computer readable medium having computer executable instructions for generating HTML based on common XSLT operable to:
- receive at a server a request from a client;
- in response to the request from the client, send from the server a first server request to a first data provider and a second data request to a second data provider;
- receive at the server, first XML data from the first data provider in response to the first server request and second XML data from the second data provider in response to the second server request, the first XML data including at least one dataset associated with at least one SVG tag or at least one table tag, and the second XML data including at least one dataset associated with at least one SVG tag or at least one table tag;
- dynamically transform, at the server, the first XML data using a common XSLT file;
- dynamically transform, at the server, the second XML data using the common XSLT file;
- determine whether the first XML data includes a plurality of datasets;
- determine whether the second XML data includes a plurality of datasets;
- automatically generate, at the server, one HTML page for each dataset included in the first XML data based, at least partially, on the first transformed XML data, each HTML page including at least one table or one SVG chart; and
- automatically generate, at the server, one HTML page for each dataset included in the second XML data based, at least partially, on the second transformed XML data, each HTML page including at least one table or one SVG chart.

7. The computer executable instructions of claim 6, wherein the first XML data includes at least one dataset associated with at least one SVG tag, the at least one SVG tag includes:
- an SVG-disabled parameter;
- an SVG-enabled parameter;
- a dimension of an SVG chart; or
- a chart type.

8. The computer executable instructions of claim 7, wherein the at least one SVG tag is a chart type comprising:
- a bar chart;
- a pie chart; or
- a line chart.

9. The computer executable instructions of claim 6, wherein the first XML data includes at least one dataset associated with at least one table tag, the at least one table tag includes:
- a table alignment;
- a column width; or
- a column data type.

10. The computer executable instructions of claim 6, at least one of the generated HTML pages including JavaScript operable to support dynamic graphics functionality.

11. A computer-implemented system for generating HTML based on common XSLT comprising:
- memory operable to store a common XSLT file; and
- one or more processors collectively operable to:
  - receive at a server a request from a client;
  - in response to the request from the client, send from the server a first server request to a first data provider and a second data request to a second data provider;
  - receive at the server, first XML data from the first data provider in response to the first server request and second XML data from the second data provider in response to the second server request, the first XML data including at least one dataset associated with at least one SVG tag or at least one table tag, and the second XML data including at least one dataset associated with at least one SVG tag or at least one table tag;
  - dynamically transform, at the server, the first XML data using a common XSLT file;
  - dynamically transform, at the server, the second XML data using the common XSLT file;
  - determine whether the first XML data includes a plurality of datasets;
  - determine whether the second XML data includes a plurality of datasets;
  - automatically generate, at the server, one HTML page for each dataset included in the first XML data based, at least partially, on the first transformed XML data, each HTML page including at least one table or one SVG chart; and
  - automatically generate, at the server, one HTML page for each dataset included in the second XML data based, at least partially, on the second transformed XML data, each HTML page including at least one table or one SVG chart.

12. The system of claim 11, wherein the first XML data includes at least one dataset associated with at least one SVG tag, the at least one SVG tag includes:
- an SVG-disabled parameter;
- an SVG-enabled parameter;
- a dimension of an SVG chart; or
- a chart type.

13. The system of claim 12, wherein the at least one SVG tag is a chart type comprising:
- a bar chart;
- a pie chart; or
- a line chart.

14. The system of claim 11, wherein the first XML data includes at least one dataset associated with at least one table tag, the at least one table tag includes:
- a table alignment;
- a column width; or
- a column data type.

15. The system of claim 11, at least one of the generated HTML pages including JavaScript operable to support dynamic graphics functionality.

16. A computer-implemented system for generating HTML based on common XSLT comprising:

means for receiving at a server a request from a client;

in response to the request from the client, means for sending from the server a first server request to a first data provider and a second data request to a second data provider;

means for receiving at the server, first XML data from the first data provider in response to the first server request and second XML data from the second data provider in response to the second server request, the first XML data including at least one dataset associated with at least one SVG tag or at least one table tag, and the second XML data including at least one dataset associated with at least one SVG tag or at least one table tag;

means for dynamically transforming, at the server, the first XML data using a common XSLT file;

means for dynamically transforming, at the server, the second XML data using the common XSLT file;

means for determining whether the first XML data includes a plurality of datasets;

means for determining whether the second XML data includes a plurality of datasets;

means for automatically generating, at the server, one HTML page for each dataset included in the first XML data based, at least partially, on the first transformed XML data, each HTML page including at least one table or one SVG chart; and means for automatically generating, at the server, one HTML page for each dataset included in the second XML data based, at least partially, on the second transformed XML data, each HTML page including at least one table or one SVG chart.

* * * * *